(12) United States Patent
Lee

(45) Date of Patent: Mar. 25, 2014
(10) Patent No.: US 8,682,647 B1

(54) SYSTEMS AND METHODS FOR ANSWERING COMPLEX QUESTIONS WITH MINED NATURAL LANGUAGE SEARCH RESULTS

(75) Inventor: John Lee, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 265 days.

(21) Appl. No.: 13/350,014

(22) Filed: Jan. 13, 2012

(51) Int. Cl.
*G06F 17/27* (2006.01)
*G06F 17/20* (2006.01)
*G06F 17/21* (2006.01)

(52) U.S. Cl.
USPC ..................... 704/9; 704/1; 704/10

(58) Field of Classification Search
None
See application file for complete search history.

(56) References Cited

U.S. PATENT DOCUMENTS

| 6,078,914 A * | 6/2000 | Redfern | 1/1 |
| 6,904,428 B2 * | 6/2005 | Frieder et al. | 1/1 |
| 6,910,003 B1 * | 6/2005 | Arnold et al. | 704/4 |
| 2002/0116176 A1 * | 8/2002 | Tsourikov et al. | 704/9 |
| 2010/0205006 A1 * | 8/2010 | Bergh | 705/3 |

* cited by examiner

*Primary Examiner* — Jesse Pullias
(74) *Attorney, Agent, or Firm* — MH2 Technology Law Group, LLP (57) ABSTRACT

Embodiments relate to systems for, and methods of, answering complex questions with mined natural language search results. The systems and methods generally accept a natural language query, retrieve initial search results for the query, and then thin the retrieved results such that acceptable natural language replies to the query are identified. The natural language results may be further processed for presentation to the requestor.

60 Claims, 4 Drawing Sheets

SYSTEMS AND METHODS FOR ANSWERING COMPLEX QUESTIONS WITH MINED NATURAL LANGUAGE SEARCH RESULTS

FIELD

The present teachings relate to systems for, and methods of, providing answers to questions posed to a search engine, and more particularly, to systems for, and methods of, providing natural language search results to natural language questions posed to a search engine.

BACKGROUND

Search engines, such as Internet search engines, generally retrieve information relating to a search query, which typically consists of a number of search terms. However, users may sometimes enter a search query in the form of a natural language question. It would be advantageous for a search engine to be capable of identifying and providing natural language answers for search queries that take the form of natural language questions.

SUMMARY

According to various embodiments, a computer implemented method of providing a natural language answer to a natural language question is disclosed. The method may include receiving, over a computer network, a query including a grammatical question and submitting the query to an lookup engine. The method may further include receiving initial search results from the lookup engine, the initial search results including a plurality of documents, where the initial search results include a ranking of the plurality of documents according to relevance. The method may further include identifying, in the plurality of documents, a plurality of candidate sentences. The method may further include calculating a frequency of a plurality of n-grams appearing in the plurality of candidate sentences, wherein n ranges at least from 1 to 2 and calculating, for each candidate sentence, a measure of commonality between the candidate sentence and the query. The method may further include assigning, to each candidate sentence, a score, where the score includes at least two of: (1) the frequency of a plurality of n-grams appearing in the candidate sentence, (2) the measure of commonality between the candidate sentence and the query, and (3) a rank of the candidate sentence according to the ranking of the plurality of documents. The method may further include sorting the candidate sentences according to score, so that a rating of candidate sentences is produced, and sending, over a computer network, a reply to the query, the reply including at least a top candidate sentence from the rating of candidate sentences.

DESCRIPTION OF DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to exemplary embodiments of the present teachings, which are illustrated in the accompanying drawings. Where possible the same reference numbers will be used throughout the drawings to refer to the same or like parts.

Figure 1:
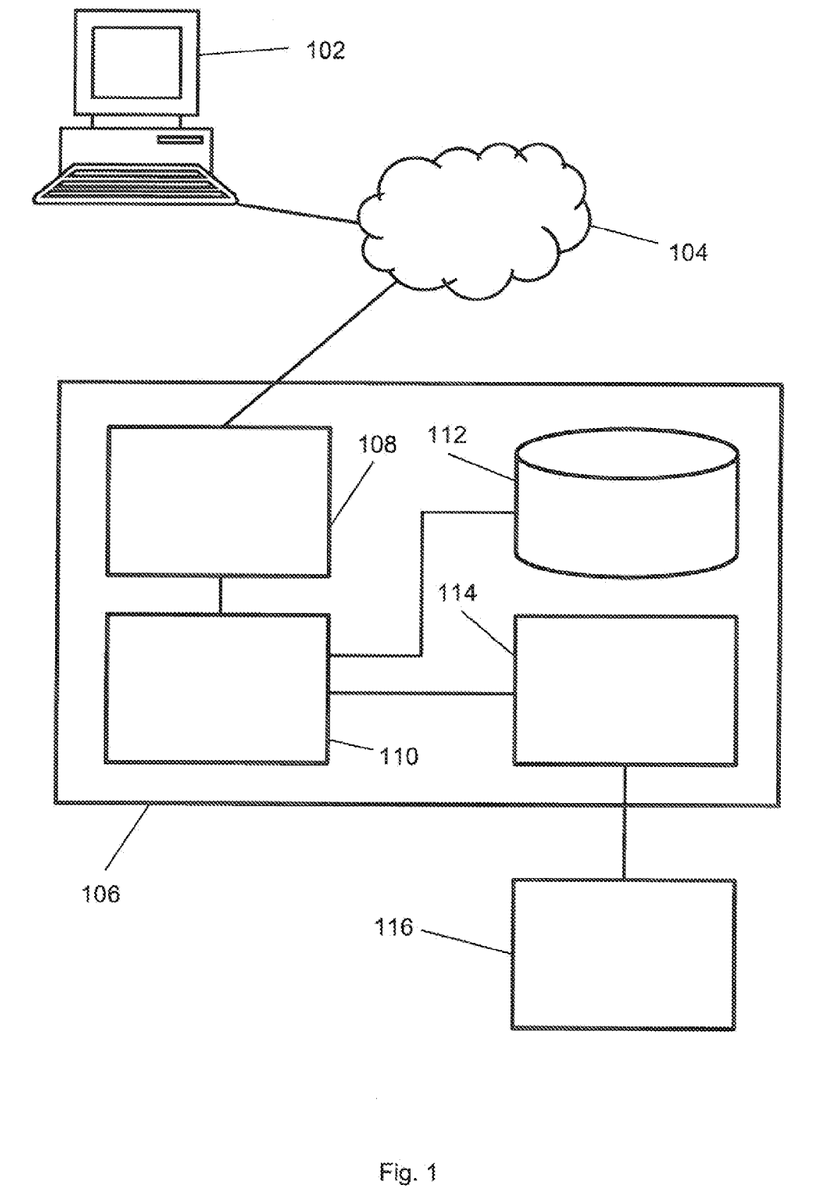
FIG. 1 is a schematic diagram of a system according to various embodiments.

FIG. 1 is a schematic diagram of a system according to various embodiments. In particular, FIG. 1 illustrates various hardware, software, and other resources that can be used in implementations of search engine 106 in systems and methods according to disclosed embodiments. In embodiments as shown, search engine 106 can include a processor 110 coupled to a random access memory operating under control of or in conjunction with an operating system. The processor 110 in embodiments can be incorporated in one or more servers, clusters, or other computers or hardware resources, or can be implemented using cloud-based resources. Processor 110 can communicate with the data store 112, such as a database stored on a local hard drive or drive array, to access or store search results or other data. Processor 110 can further communicate with a network interface 108, such as an Ethernet or wireless data connection, which in turn communicates with the one or more networks 104, such as the Internet or other public or private networks, via which a search query can be received from client device 102, or other device or service. Client device 102 can be, e.g., a portable computer, a desktop computer, a tablet computer, or a smart phone.

Processor 110 can be further communicatively coupled to interface 114 (e.g., an Ethernet or wireless data connection) which, in turn, can communicate with lookup engine 116. Lookup engine 116 can be a web-based search engine, a proprietary search engine, or a document lookup engine that is capable of returning, in response to a query, ranked search results containing natural language sentences. In some embodiments, lookup engine forms a part of an integrated system and can be internal to search engine 106 itself.

Processor 110 can, in general, be programmed or configured to execute control logic and control search operations and to analyze a search query. Other configurations of the search engine 106, associated network connections, and other hardware, software, and service resources are possible.

Figure 2:
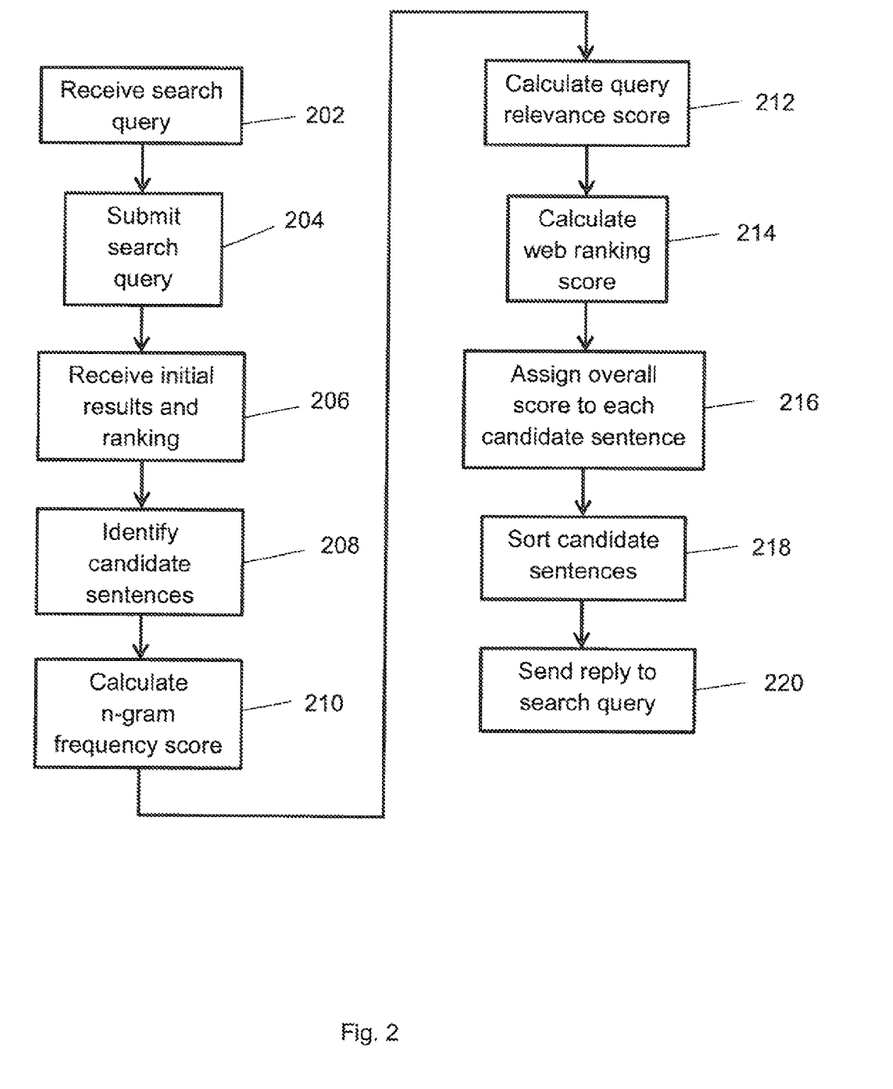
FIG. 2 is a flowchart of a method according to various embodiments.

FIG. 2 is a flowchart of a method according to various embodiments. The method illustrated in reference to FIG. 2 may be implemented using, by way of non-limiting example, the system depicted in FIG. 1. At block 202, a search query is received. The search query can be an interrogatory in natural language. That is, the search query may be a sentence in the form of a question. The question may be in any language, such as by way of non-limiting example, English, French, Italian, Spanish, etc. The search query can include a punctuation at its end, e.g., a question mark ("?"), or can omit such punctuation. The search query may be sent by a user from a client device (e.g., client device 102 of FIG. 1) and received at a search engine (e.g., 106 of FIG. 1). The search engine into which the human user enters the search query may be, e.g., a web based search engine.

At block 204, the search query may be submitted to a lookup engine (e.g., 116 of FIG. 1). The submission can be of the entire query as a unitary string (e.g., by enclosing the query in quotes) or can be of each word in the query simultaneously (e.g., by submitting the query as a whole but without enclosing quotes). The lookup engine can be web based or otherwise, and may be contacted via an interface (e.g., 114 of FIG. 1). The submission itself may occur using a standard networking protocol, e.g., TCP/IP, HTTP, etc. In some embodiments, the lookup engine may be part of an overall self-contained system (e.g., 106 of FIG. 1).

At block 206, initial search results are received. The initial search results can comprise a set of documents along with references (e.g., uniform resource locators) thereto. In this disclosure, the term "documents" includes, by way of non-limiting example, web pages, electronically formatted books, portable document format (PDF) documents, text documents, audio transcripts, word processor documents, other media, and portions or combinations of any of the preceding. The term "documents" also embraces copies (e.g., cached copies) of any data types discussed in the prior sentence. The initial search results may contain text in a computer-readable format (e.g., ASCII, HTML, XML, etc.). At least one of the initial search results may contain natural language sentences, which are operated on as discussed in detail below.

The initial search results may be received together with a ranking according to relevance. One such ranking is implicit in the format of the results themselves, e.g., a ranking exists if the results are presented in a list format, where the highest-ranked result would appear first in the list, the next-highest-ranked appearing next, and the lowest ranked result appearing last. Alternately, in some embodiments, the initial search results lack an associated relevance ranking.

At block 208, candidate sentences may be identified in the initial search results. Identification may be performed by a parsing routine, known to those of skill in the art. The parsing routine can look for a capitalized word to mark the beginning of a sentence and a period to mark the end. Alternately, or in addition, the parsing routine can look for grammatical structures to identify sentences. Regardless of particular parsing technique, items in the initial search results can be automatically parsed for sentence structures. Each such structure can be identified and considered a candidate sentence. In some embodiments, representations of such candidate sentences (e.g., in one or both of ASCII and XML) are stored in memory (e.g., random access memory or data store 112 of FIG. 1). Each candidate sentence can be stored in association with an identification of the particular search result (e.g., document or web page) in which it appeared. The identification may be a URL, an IP address, a hash thereof, or a different type of unique identifier. If the search result has an associated ranking, the candidate sentence that appears in the search result can be stored in association with the ranking.

At block 210, overall n-gram frequency scores are calculated for each candidate sentence. An "n-gram" is a string of n words. Thus, a 1-gram is a single word, a 2-gram is a sequence of two words, a 3-gram is a sequence of three words, etc. (An example 3-gram is "alligators found gracefully"). An n-gram may be a sentence or a sentence fragment. Punctuation in an n-gram may be removed or disregarded. At block 210, the process can tally a total number of appearances, in all candidate sentences, of each n-gram that appears in any of the candidate sentences. In some embodiments, n-gram frequencies may be calculated for values of n ranging up to and including any value selected from 2 to 10, inclusive. In some embodiments, n-gram frequencies may be calculated for all values of n ranging up to the length of the longest candidate sentence. Thus, each n-gram has an associated frequency of appearances in the candidate sentences. N-gram frequencies can be stored in association with each n-gram appearing in the candidate sentences. Thus, a data structure representing a function from n-grams to their frequencies may be stored in memory at block 210.

To calculate an overall n-gram frequency score for a particular candidate sentence, some embodiments utilize a weighted sum of individual n-gram frequencies for multiple values of n. In such embodiments, the overall n-gram frequency score may be calculated as, by way of non-limiting example:

$$C(S) = \sum_{n=1}^{N} n^2 C_n(S)$$

In the above equation, S is the candidate sentence being associated with the overall n-gram frequency score C(S), the parameter N is the upper limit on n-gram length (e.g., for embodiments that consider n-grams for n=1, . . . , 10, the parameter N would be 10), and each $C_n(S)$ is an individual n-gram score for the candidate sentence S for a particular value of n.

In alternate embodiments, the overall n-gram frequency score may be a simple sum of n-gram frequencies, or may be a linearly-weighted sum of n-gram frequencies (i.e., a sum over n of terms $nC_n(S)$).

The portion of the process depicted at block 210 is optional. That is, some embodiments omit calculating an n-gram frequency score. In embodiments where an overall score (discussed in detail below in reference to block 216) can include the n-gram frequency score as a multiplicative factor, the n-gram frequency score in this example may be set to one (1), such that its product is unchanged.

At block 212, a query relevance score is calculated for each candidate sentence. Each query relevance score is meant to measure the amount of overlap in meaning between the query received at block 202 and the candidate sentence being scored. In some embodiments, the query relevance score is a tally of words in common between the candidate sentence being scored and the initial search query. For example, consider the initial query "Why is the sky blue?" and the candidate sentence "The sky is blue because the sunset is red.". An exemplary query relevance score for this candidate sentence is four (4), because the following words are common between the initial query and the candidate sentence: "is", "the", "sky", and "blue".

In some embodiments, stop words are not counted for the query relevance score. A "stop word" is a common word that is too frequently used to confer useful meaning to the query relevance score. An exemplary list of stop word is: "around", "have", "he", "the", "of", "to", "in", "for", "is", "on", "that", "by", "with", "this", "be", "www", "are", "as", "i", "here", "his", "her", "if", "me", "from", "a", "com", "an", "about", "was", "edu", "who", "what", "where", "when", "why", "how", "she", "than", "that", "them", "they", "were", "you", "your", "which", "en", "&", "a", "and", "it", "at" and "or". Returning to the above example, in embodiments that omit consideration of the above stop words, the query relevance score for the example candidate sentence may be two (2), because the stop words "is" and "the" are not counted.

In some embodiments, synonyms are considered in calculating the query relevance score. For example, consider again the initial query "Why is the sky blue?", but now consider the candidate sentence "The heavens are blue because the sunset is red.". In an embodiment that does not omit stop words, the query relevance score for this candidate sentence may be four (4). This score is determined by noting the following common words: "is", "the" and "blue". In addition, "sky" and "heavens" are synonyms. Accordingly, in the exemplary embodiment under discussion, there are three common identical words and one common set of synonyms, for a total query relevance score of four (4).

In some embodiments, the query relevance score may be omitted. Such embodiments include those in which more than a predetermined percentage of words are common between the initial query and the candidate sentence under consideration. In some embodiments, the predetermined percentage may be, by way of non-limiting example, any percentage between 80% and 100%, inclusive. This is to prevent candidate sentences that are just identical (or nearly identical) copies of the search query from being considered. For example, if both the candidate sentence and the initial query are "Why is the sky blue?", then certain embodiments will not utilize the query relevance score. In embodiments where an overall score (discussed in detail below in reference to block 216) can include the query relevance score as a multiplicative factor, the query relevance score in this example may be set to one (1), such that its product is unchanged.

At block 214, a web ranking score is calculated for each candidate sentence. The web ranking score for a candidate sentence can be the relevancy ranking of the associated search result subtracted from a constant, e.g., the number 10. For example, a candidate sentence that appears in the second-ranked search result from block 206 can have a web ranking score of 10-2=8. Note that other embodiments can use different constants (e.g., 3, 4, 5, 6, 7, 8, 9). In some embodiments, instead of a constant, the web ranking score is an inversion of the search result rankings. That is, if a certain number of search results are produced at block 206, then the constant can be set to be that number. For example, if fifteen (15) search results are produced at block 206, then the associated web ranking scores would be 1, 2, 3, . . . , 13, 14 or 15. In this example, candidate sentences that appear in the highest-ranked search result can be scored fifteen (15), and those from the lowest ranked scored one (1).

The portion of the process depicted at block 214 is optional. That is, some embodiments omit calculating a web ranking score. Such embodiments can include those that lack a search result ranking at block 206. That is, in embodiments where the lookup engine utilized in relation to blocks 204 and 206 does not produce a ranking of search results, block 214 may be omitted. In embodiments where an overall score (discussed in detail below in reference to block 216) can include the web ranking score as a multiplicative factor, the web ranking score in this example may be set to one (1), such that its product is unchanged.

At block 216, an overall score is assigned to each candidate sentence. In some embodiments, the overall score of a candidate sentence is the product of the overall n-gram frequency score for the candidate sentence, the web ranking score for the candidate sentence, and the query relevance score for the candidate sentence. As discussed above, in some circumstances (e.g., where the candidate sentence and the initial query are identical), the query relevance score may be set to one (1) or disregarded. Further, in some embodiments, either of the web ranking score and the n-gram frequency score may be set to one (1) or omitted from the overall score for a candidate sentence.

In alternate embodiments, the overall score for a candidate sentence is the sum of the overall n-gram frequency score for the candidate sentence, the web ranking score for the candidate sentence and the query relevance score for the candidate sentence. If the query relevance score is to be disregarded in such embodiments, it may be set to zero (0). Likewise, if either of the n-gram frequency score or the web ranking score is not used in such embodiments, it may be set to zero (0) or otherwise disregarded.

In yet alternate embodiments, the overall score for a candidate sentence may be calculated as the geometric mean of the overall n-gram frequency score for the candidate sentence, the web ranking score for the candidate sentence and the query relevance score for the candidate sentence. For example, the overall score in such embodiments may be set as the cube root of the product of the overall n-gram frequency score, the web ranking score, and the query relevance score. In such embodiments, if the query relevance score is to be disregarded, the overall score for the candidate sentence may be set as the square root of the product of the overall n-gram frequency score and the web ranking score. Similarly, if the web ranking score is omitted, the overall score for the candidate sentence may be set as the square root of the product of the overall n-gram frequency score and the query relevance score in such embodiments. If the n-gram frequency score is omitted, the overall score for the candidate sentence may be set as the square root of the product of the web ranking score and the query relevance score in such embodiments. If both the query relevance score and the web ranking score are omitted, the overall score may be set to equal the overall n-gram score.

In sum, at block 216, the candidate sentences are each assigned an overall score.

At block 218, the candidate sentences may be sorted according to overall score. This may be achieved by selecting at least a top few candidate sentences according to overall score, or by sorting a data structure according to overall score. That is, the candidate sentences with associated overall scores need not literally be sorted, as long as the process of block 218 selects at least the top few according to overall score. An exemplary result of the process described in reference to block 218 is a list of candidate sentences arranged according to descending overall score.

At block 220, a reply to the search query is transmitted. The transmission may be to a user's personal computer (e.g., client device 102 of FIG. 1) using, by way of non-limiting example, any, or a combination, of TCP/IP, XML and HTTP. In some embodiments, only a top few candidate sentences (according to overall score) are sent in the reply. Such embodiments may send, by way of non-limiting example, the top few candidate sentences (e.g., any of the top n candidate sentences, where n may be any number 1-15).

In some embodiments, only candidate sentences whose overall score exceeds a predetermined threshold are sent. The threshold may depend on the particular technique that is used to calculate overall scores. Some embodiments combine elements of the two embodiments discussed earlier in this paragraph. Such embodiments may send out the top few candidate sentences if their associated overall score exceeds a predetermined threshold.

Some embodiments send out the candidate sentences (possibly a subset thereof, as discussed above), in conjunction with traditional search results, e.g., those that are retrieved at block 206 of FIG. 2. In such embodiments, the complete set of search results may be sent in a HTML or XML format, such that the candidate sentence results are set off from the other search results (e.g., one or both of at the beginning of the electronic document and in a separate box).

Figure 3:
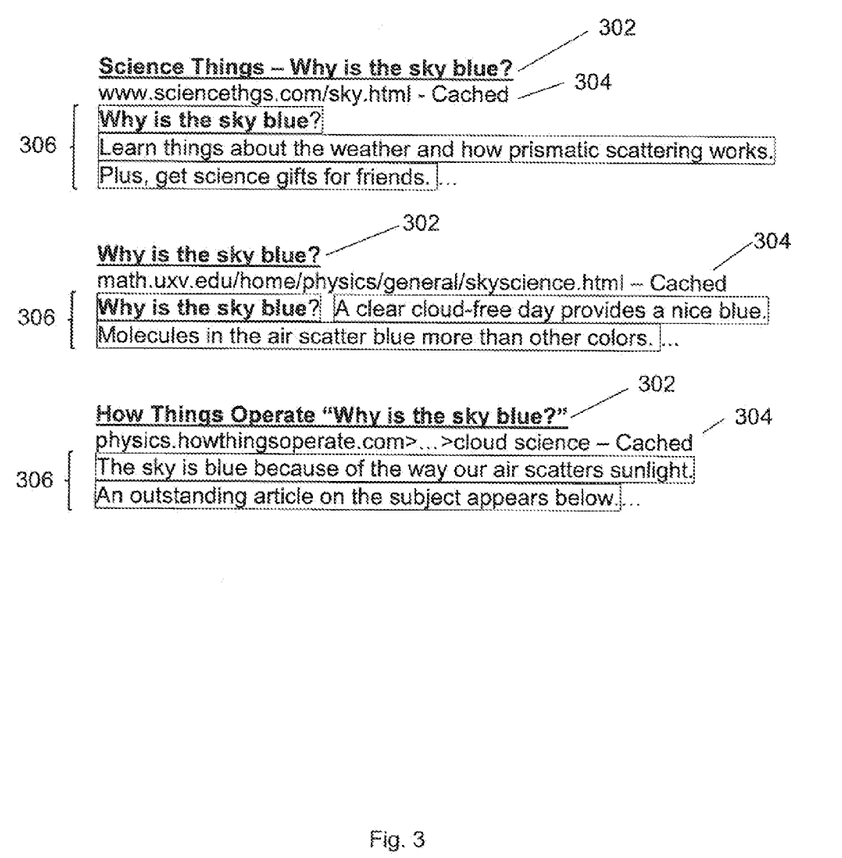
FIG. 3 is a schematic description of an internal process according to various embodiments.

FIG. 3 is a schematic description of an internal process according to various embodiments. In particular, FIG. 3 shows document titles 302, document links 304 (e.g., uniform resource locators) and document excerpts 306, of documents that contain candidate sentences. Each candidate sentence is designated as such in FIG. 3 by being enclosed in a box. The schematic description according to FIG. 3 may correspond to, e.g., blocks 306 and 208 of FIG. 2.

Figure 4:
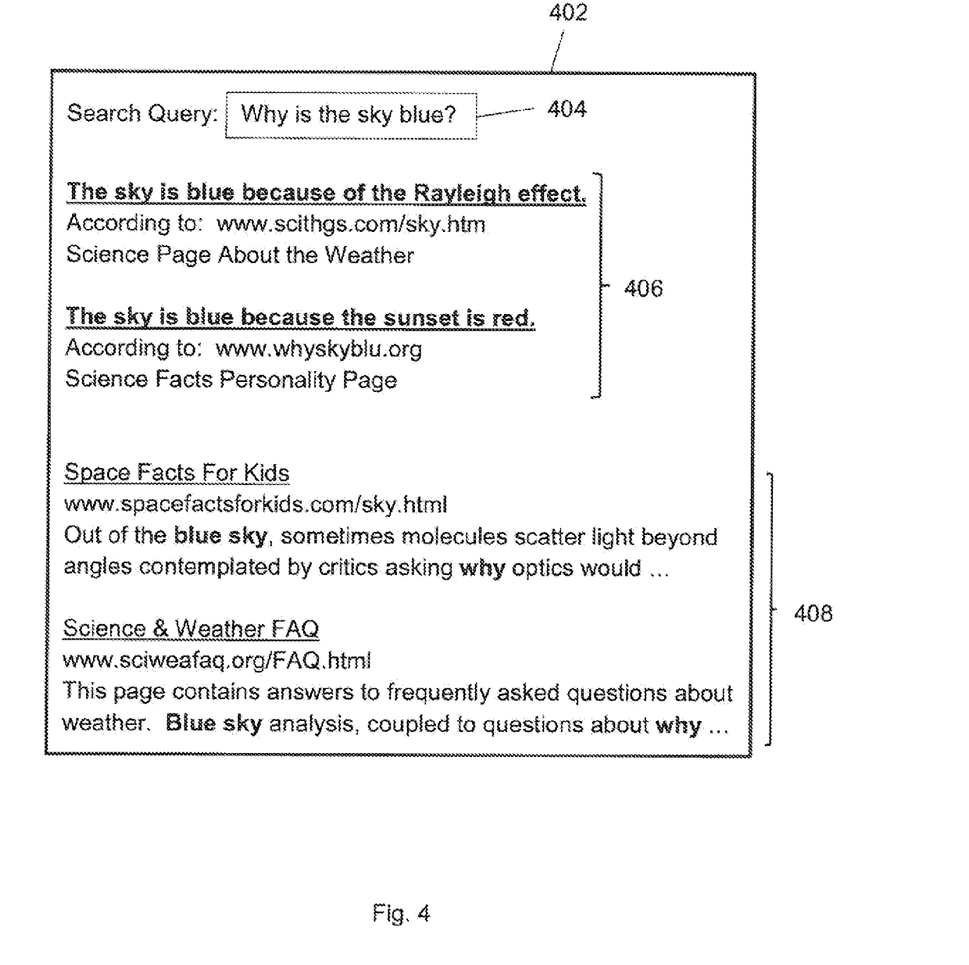
FIG. 4 is an exemplary display of search results according to various embodiments.

FIG. 4 is an exemplary display of search results according to various embodiments. In particular, FIG. 4 depicts, in schematic form, an exemplary layout 402 for search results according to various embodiments. Layout 402 may be created using, e.g., HTML or XML. Search query field 404 may be automatically populated with the search query for which results are displayed.

Layout 402 may include a candidate sentence portion 406, which displays candidate sentences with a sufficient overall score. Each displayed candidate sentence may be highlighted, e.g., by using an underlined and/or bold font. A designator, e.g., "according to", may be displayed below each candidate sentence, followed by a link (e.g., uniform resource locator) associated with the candidate sentence. That is, each candidate sentence may be displayed above a hyperlink, such that clicking on the hyperlink leads to the web page on which the respective candidate sentence appeared. Each candidate sentence may further appear in conjunction with a title (e.g., an HTML title) of its associated originating website. As depicted in FIG. 4, such a title may be displayed below the associated link.

Layout 402 may further include remaining search results portion 408, which may be offset below candidate sentence portion 406 using a vertical space or other separator (e.g., a horizontal line). Each standard search result may include a hyperlink to the relevant page, and may be presented together with an excerpt thereof.

The foregoing description is illustrative, and variations in configuration and implementation may occur to persons skilled in the art. Other resources described as singular or integrated can in embodiments be plural or distributed, and resources described as multiple or distributed can in embodiments be combined. The scope of the present teachings is accordingly intended to be limited only by the following claims.

What is claimed is:

1. A computer implemented method of providing a natural language answer to a natural language question, the method comprising:
  receiving, over a computer network, a query comprising a grammatical question;
  submitting the query to a lookup engine;
  receiving initial search results from the lookup engine, the initial search results comprising a plurality of documents;
  identifying, in the plurality of documents, a plurality of candidate sentences;
  calculating a frequency of a plurality of n-grams appearing in the plurality of candidate sentences, wherein n ranges at least from 1 to 2;
  calculating, for each candidate sentence, a measure of commonality between the candidate sentence and the query;
  assigning, to each candidate sentence, a score, wherein the score comprises (1) the frequency of a plurality of n-grams appearing in the candidate sentence, and (2) the measure of commonality between the candidate sentence and the query;
  sorting the candidate sentences according to score, whereby a rating of candidate sentences is produced; and
  sending, over a computer network, a reply to the query, the reply comprising at least a top candidate sentence from the rating of candidate sentences.

2. The method of claim 1, wherein the lookup engine is a web based search engine.

3. The method of claim 1, wherein each score comprises a product of (1) the frequency of a plurality of n-grams appearing in the candidate sentence, and (2) the measure of commonality between the candidate sentence and the query.

4. The method of claim 1, wherein the measure of commonality comprises a count of common words.

5. The method of claim 1, wherein the initial search results comprise a ranking of the plurality of documents according to relevance; wherein each score further comprises, for each candidate sentence, a rank of the candidate sentence according to the ranking of the plurality of documents.

6. The method of claim 5, wherein the score comprises a product of at least (1) the frequency of a plurality of n-grams appearing in the candidate sentence, (2) the measure of commonality between the candidate sentence and the query, and (3) the rank of the candidate sentence according to the ranking of the plurality of documents.

7. The method of claim 1, wherein the reply comprises candidate sentences whose scores meet a predetermined threshold.

8. The method of claim 1, wherein the reply comprises at least a top three candidate sentences according to the rating of candidate sentences.

9. The method of claim 1, wherein each score comprises the frequency of a plurality of n-grams appearing in the candidate sentence weighted according to n-gram length.

10. The method of claim 1, wherein each score comprises a geometric mean of (1) the frequency of a plurality of n-grams appearing in the candidate sentence, and (2) the measure of commonality between the candidate sentence and the query.

11. A system for providing a natural language answer to a natural language question, the system comprising:
  an interface configured to receive, over a computer network, a query comprising a grammatical question;
  an interface configured to submit the query to a lookup engine;
  an interface configured to receive initial search results from the lookup engine, the initial search results comprising a plurality of documents;
  a processor configured to identify, in the plurality of documents, a plurality of candidate sentences;
  a processor configured to calculate a frequency of a plurality of n-grams appearing in the plurality of candidate sentences, wherein n ranges at least from 1 to 2;
  a processor configured to calculate, for each candidate sentence, a measure of commonality between the candidate sentence and the query;
  a processor configured to assign, to each candidate sentence, a score, wherein the score comprises (1) the frequency of a plurality of n-grams appearing in the candidate sentence, and (2) the measure of commonality between the candidate sentence and the query;
  a processor configured to sort the candidate sentences according to score, whereby a rating of candidate sentences is produced; and
  an interface configured to send, over a computer network, a reply to the query, the reply comprising at least a top candidate sentence from the rating of candidate sentences.

12. The system of claim 11, wherein the lookup engine is a web based search engine.

13. The system of claim 11, wherein each score comprises a product of (1) the frequency of a plurality of n-grams appearing in the candidate sentence, and (2) the measure of commonality between the candidate sentence and the query.

14. The system of claim 11, wherein the measure of commonality comprises a count of common words.

15. The system of claim 11, wherein the initial search results comprise a ranking of the plurality of documents according to relevance; wherein each score further comprises, for each candidate sentence, a rank of the candidate sentence according to the ranking of the plurality of documents.

16. The system of claim 15, wherein the score comprises a product of at least (1) the frequency of a plurality of n-grams appearing in the candidate sentence, (2) the measure of commonality between the candidate sentence and the query, and (3) the rank of the candidate sentence according to the ranking of the plurality of documents.

17. The system of claim 11, wherein the reply comprises candidate sentences whose scores meet a predetermined threshold.

18. The system of claim 11, wherein the reply comprises at least a top three candidate sentences according to the rating of candidate sentences.

19. The system of claim 11, wherein each score comprises the frequency of a plurality of n-grams appearing in the candidate sentence weighted according to n-gram length.

20. The system of claim 11, wherein each score comprises a geometric mean of (1) the frequency of a plurality of n-grams appearing in the candidate sentence, and (2) the measure of commonality between the candidate sentence and the query.

21. A computer implemented method of providing a natural language answer to a natural language question, the method comprising:
   receiving, over a computer network, a query comprising a grammatical question;
   submitting the query to a lookup engine;
   receiving initial search results from the lookup engine, the initial search results comprising a plurality of documents, wherein the initial search results comprise a ranking of the plurality of documents according to relevance;
   identifying, in the plurality of documents, a plurality of candidate sentences;
   calculating a frequency of a plurality of n-grams appearing in the plurality of candidate sentences, wherein n ranges at least from 1 to 2;
   assigning, to each candidate sentence, a score, wherein the score comprises (1) the frequency of a plurality of n-grams appearing in the candidate sentence, and (2) a rank of the candidate sentence according to the ranking of the plurality of documents;
   sorting the candidate sentences according to score, whereby a rating of candidate sentences is produced; and
   sending, over a computer network, a reply to the query, the reply comprising at least a top candidate sentence from the rating of candidate sentences.

22. The method of claim 21, wherein the lookup engine is a web based search engine.

23. The method of claim 21, wherein each score comprises a product of (1) the frequency of a plurality of n-grams appearing in the candidate sentence, and (2) the rank of the candidate sentence according to the ranking of the plurality of documents.

24. The method of claim 21, wherein each score further comprises, for each candidate sentence, a measure of commonality between the candidate sentence and the query.

25. The method of claim 24, wherein the score comprises a product of at least (1) the frequency of a plurality of n-grams appearing in the candidate sentence, (2) the measure of commonality between the candidate sentence and the query, and (3) the rank of the candidate sentence according to the ranking of the plurality of documents.

26. The method of claim 25, wherein the measure of commonality comprises a count of common words.

27. The method of claim 21, wherein the reply comprises candidate sentences whose scores meet a predetermined threshold.

28. The method of claim 21, wherein the reply comprises at least a top three candidate sentences according to the rating of candidate sentences.

29. The method of claim 21, wherein each score comprises the frequency of a plurality of n-grams appearing in the candidate sentence weighted according to n-gram length.

30. The method of claim 21, wherein each score, comprises a geometric mean of (1) the frequency of a plurality of n-grams appearing in the candidate sentence, and (2) the rank of the candidate sentence according to the ranking of the plurality of documents.

31. A system for providing a natural language answer to a natural language question, the system comprising:
   an interface configured to receive, over a computer network, a query comprising a grammatical question;
   an interface configured to submit the query to a lookup engine;
   an interface configured to receive initial search results from the lookup engine, the initial search results comprising a plurality of documents, wherein the initial search results comprise a ranking of the plurality of documents according to relevance;
   a processor configured to identify, in the plurality of documents, a plurality of candidate sentences;
   a processor configured to calculate a frequency of a plurality of n-grams appearing in the plurality of candidate sentences, wherein n ranges at least from 1 to 2;
   a processor configured to assign, to each candidate sentence, a score, wherein the score comprises (1) the frequency of a plurality of n-grams appearing in the candidate sentence, and (2) a rank of the candidate sentence according to the ranking of the plurality of documents;
   a processor configured to sort the candidate sentences according to score, whereby a rating of candidate sentences is produced; and
   an interface configured to send, over a computer network, a reply to the query, the reply comprising at least a top candidate sentence from the rating of candidate sentences.

32. The system of claim 31, wherein the lookup engine is a web based search engine.

33. The system of claim 31, wherein each score comprises a product of (1) the frequency of a plurality of n-grams appearing in the candidate sentence, and (2) the rank of the candidate sentence according to the ranking of the plurality of documents.

34. The system of claim 31, wherein each score further comprises, for each candidate sentence, a measure of commonality between the candidate sentence and the query.

35. The system of claim 34, wherein the score comprises a product of at least (1) the frequency of a plurality of n-grams appearing in the candidate, sentence, (2) the measure of commonality between the candidate sentence and the query, and (3) the rank of the candidate sentence according to the ranking of the plurality of documents.

36. The system of claim 35, wherein the measure of commonality comprises a count of common words.

37. The system of claim 31, wherein the reply comprises candidate sentences whose scores meet a predetermined threshold.

38. The system of claim 31, wherein the reply comprises at least a top three candidate sentences according to the rating of candidate sentences.

39. The system of claim 31, wherein each score comprises the frequency of a plurality of n-grams appearing in the candidate sentence weighted according to n-gram length.

40. The system of claim 31, wherein each score comprises a geometric mean of (1) the frequency of a plurality of n-grams appearing in the candidate sentence, and (2) the rank of the candidate sentence according to the ranking of the plurality of documents.

41. A computer implemented method of providing a natural language answer to a natural language question, the method comprising:
- receiving, over a computer network, a query comprising a grammatical question;
- submitting the query to a lookup engine;
- receiving initial search results from the lookup engine, the initial search results comprising a plurality of documents, wherein the initial search results comprise a ranking of the plurality of documents according to relevance;
- identifying, in the plurality of documents, a plurality of candidate sentences;
- calculating, for each candidate sentence, a measure of commonality between the candidate sentence and the query;
- assigning, to each candidate sentence, a score, wherein the score comprises (1) a rank of the candidate sentence according to the ranking of the plurality of documents, and (2) the measure of commonality between the candidate sentence and the query;
- sorting the candidate sentences according to score, whereby a rating of candidate sentences is produced; and
- sending, over a computer network, a reply to the query, the reply comprising at least a top candidate sentence from the rating of candidate sentences.

42. The method of claim 41, wherein the lookup engine is a web based search engine.

43. The method of claim 41, wherein each score comprises a product of (1) the rank of the candidate sentence according to the ranking of the plurality of documents, and (2) the measure of commonality between the candidate sentence and the query.

44. The method of claim 41, wherein the measure of commonality comprises a count of common words.

45. The method of claim 41, further comprising calculating a frequency of a plurality of n-grams appearing in the plurality of candidate sentences, wherein n ranges at least from 1 to 2.

46. The method of claim 45, wherein the score comprises a product of at least (1) the frequency of a plurality of n-grams appearing in the candidate sentence, (2) the measure of commonality between the candidate sentence and the query, and (3) the rank of the candidate sentence according to the ranking of the plurality of documents.

47. The method of claim 41, wherein each score comprises a geometric mean of (1) the rank of the candidate sentence according to the ranking of the plurality of documents, and (2) the measure of commonality between the candidate sentence and the query.

48. The method of claim 45, wherein each score comprises the frequency of a plurality of n-grams appearing in the candidate sentence weighted according to n-gram length.

49. The method of claim 41, wherein the reply comprises candidate sentences whose scores meet a predetermined threshold.

50. The method of claim 41, wherein the reply comprises at least a top three candidate sentences according to the rating of candidate sentences.

51. A system for providing a natural language answer to a natural language question, the system comprising:
- an interface configured to receive, over a computer network, a query comprising a grammatical question;
- an interface configured to submit the query to a lookup engine;
- an interface configured to receive initial search results from the lookup engine, the initial search results comprising a plurality of documents, wherein the initial search results comprise a ranking of the plurality of documents according to relevance;
- a processor configured to identify, in the plurality of documents, a plurality of candidate sentences;
- a processor configured to calculate, for each candidate sentence, a measure of commonality between the candidate sentence and the query;
- a processor configured to assign, to each candidate sentence, a score, wherein the score comprises (1) a rank of the candidate sentence according to the ranking of the plurality of documents, and (2) the measure of commonality between the candidate sentence and the query;
- a processor configured to sort the candidate sentences according to score, whereby a rating of candidate sentences is produced; and
- an interface configured to send, over a computer network, a reply to the query, the reply comprising at least a top candidate sentence from the rating of candidate sentences.

52. The system of claim 51, wherein the lookup engine is a web based search engine.

53. The system of claim 51, wherein each score comprises a product of (1) the rank of the candidate sentence according to the ranking of the plurality of documents, and (2) the measure of commonality between the candidate sentence and the query.

54. The system of claim 51, wherein the measure of commonality comprises a count of common words.

55. The system of claim 51, further comprising a processor configured to calculate a frequency of a plurality of n-grams appearing in the plurality of candidate sentences, wherein n ranges at least from 1 to 2.

56. The system of claim 55, wherein the score comprises a product of at least (1) the frequency of a plurality of n-grams appearing in the candidate sentence, (2) the measure of commonality between the candidate sentence and the query, and (3) the rank of the candidate sentence according to the ranking of the plurality of documents.

57. The system of claim 55, wherein each score comprises the frequency of a plurality of n-grams appearing in the candidate sentence weighted according to n-gram length.

58. The system of claim 51, wherein each score comprises a geometric mean of (1) the rank of the candidate sentence according to the ranking of the plurality of documents, and (2) the measure of commonality between the candidate sentence and the query.

59. The system of claim 51, wherein the reply comprises candidate sentences whose scores meet a predetermined threshold.

60. The system of claim 51, wherein the reply comprises at least a top three candidate sentences according to the rating of candidate sentences.

* * * * *